(12) United States Patent
Dikhit et al.

(10) Patent No.: US 11,693,976 B2
(45) Date of Patent: Jul. 4, 2023

(54) PEER-TO-PEER CONFIDENTIAL DOCUMENT EXCHANGE

(71) Applicant: American Express Travel Related Services Company, Inc., New York, NY (US)

(72) Inventors: Jitendra Singh Dikhit, Bangalore (IN); Alaric M. Eby, Scottsdale, AZ (US); Andras L. Ferenczi, Peoria, AZ (US); Ashish Kumar, Bangalore (IN)

(73) Assignee: American Express Travel Related Services Company, Inc., New York, NY (US)

(*) Notice: Subject to any disclaimer, the term of this patent is extended or adjusted under 35 U.S.C. 154(b) by 204 days.

(21) Appl. No.: 17/114,000

(22) Filed: Dec. 7, 2020

(65) Prior Publication Data

US 2021/0117554 A1 Apr. 22, 2021

Related U.S. Application Data

(63) Continuation of application No. 16/217,654, filed on Dec. 12, 2018, now Pat. No. 10,860,726.

(51) Int. Cl.
*H04L 29/06* (2006.01)
*G06F 21/60* (2013.01)
(Continued)

(52) U.S. Cl.
CPC .............. *G06F 21/602* (2013.01); *G06F 9/54* (2013.01); *H04L 9/30* (2013.01); *H04L 9/321* (2013.01)

(58) Field of Classification Search
CPC .......... G06F 21/602; G06F 9/54; G06F 21/60; G06F 21/62; G06F 21/6209;
(Continued)

(56) References Cited

U.S. PATENT DOCUMENTS 8,316,237 B1 11/2012 Felsher et al.
9,613,220 B2 4/2017 O'Hare et al.
(Continued)

FOREIGN PATENT DOCUMENTS

CN 102664728 B 4/2015
WO WO 1998/011716 A1 3/1998

OTHER PUBLICATIONS

International Search Report and Written Opinion of the International Searching Authority directed to related International Patent Application No. PCT/US2019/066009, dated Apr. 9, 2020; 9 pages.

*Primary Examiner* — Malcolm Cribbs
(74) *Attorney, Agent, or Firm* — Sterne, Kessler, Goldstein & Fox P.L.L.C.

(57) ABSTRACT

Systems and methods for peer-to-peer secure document exchange are disclosed. The system may allow a document provider to securely transmit a certified document to a document verifier using decentralized storage. The verifier system may generate a session key pair and transmit the session public key to a trusted API provider. The trusted API provider may generate a session nonce. The verifier system may transmit the session nonce to the provider system. The provider system may use the session nonce to retrieve the session public key. The provider system may encrypt a certified document using the session public key and store the encrypted certified document in the decentralized storage. The verifier system may retrieve the encrypted certified document by polling the trusted API provider based on the session nonce. The verifier system may decrypt the encrypted certified document using the session private key.

12 Claims, 5 Drawing Sheets

(51) Int. Cl.
*H04L 9/32* (2006.01)
*H04L 9/30* (2006.01)
*G06F 9/54* (2006.01)

(58) Field of Classification Search
CPC ....... G06F 21/6218; G06F 21/64; H04L 9/30; H04L 9/321; H04L 63/0428; H04L 63/0442; H04L 63/10; H04L 63/12; H04L 63/123
See application file for complete search history.

(56) References Cited

U.S. PATENT DOCUMENTS

| | | | |
|---|---|---|---|
| 10,025,913 B2 | 7/2018 | Tian et al. | |
| 10,057,225 B1* | 8/2018 | Hayes | G06Q 20/223 |
| 10,491,574 B1 | 11/2019 | Jung et al. | |
| 10,860,726 B2 | 12/2020 | Dikhit et al. | |
| 10,911,224 B1* | 2/2021 | Marappan | H04W 12/106 |
| 2005/0257074 A1 | 11/2005 | Alkove et al. | |
| 2005/0262247 A1 | 11/2005 | Whitehead | |
| 2006/0005044 A1* | 1/2006 | Uchikawa | H04L 63/104 713/168 |
| 2009/0037748 A1 | 2/2009 | Kim et al. | |
| 2009/0052670 A1 | 2/2009 | You et al. | |
| 2009/0089593 A1 | 4/2009 | Kuno et al. | |
| 2009/0150169 A1* | 6/2009 | Kirkwood | G06Q 40/00 705/342 |
| 2010/0257351 A1 | 10/2010 | O'Connor et al. | |
| 2012/0023568 A1 | 1/2012 | Cha et al. | |
| 2013/0124456 A1 | 5/2013 | Balinsky et al. | |
| 2015/0324592 A1 | 11/2015 | Dutta | |
| 2015/0365385 A1 | 12/2015 | Hore | |
| 2015/0381588 A1 | 12/2015 | Huang et al. | |
| 2016/0063220 A1* | 3/2016 | Vlot | H04L 63/0428 726/29 |
| 2016/0226829 A1 | 8/2016 | Steeves et al. | |
| 2016/0035997 A1 | 12/2016 | Battle et al. | |
| 2016/0359975 A1 | 12/2016 | Battle et al. | |
| 2017/0141921 A1* | 5/2017 | Berger | H04L 63/123 |
| 2017/0187695 A1* | 6/2017 | Narayanan | H04L 9/0877 |
| 2017/0201498 A1 | 7/2017 | Baig et al. | |
| 2017/0272209 A1 | 9/2017 | Yanovsky et al. | |
| 2019/0182044 A1* | 6/2019 | Mullen | H04L 9/3247 |
| 2020/0211004 A1* | 7/2020 | Ng | G06Q 20/4097 |

\* cited by examiner

PEER-TO-PEER CONFIDENTIAL DOCUMENT EXCHANGE

CROSS-REFERENCE TO RELATED APPLICATIONS

This application is a continuation of copending U.S. patent application Ser. No. 16/217,654, entitled "PEER-TO-PEER CONFIDENTIAL DOCUMENT EXCHANGE" and filed on Dec. 12, 2018, which is incorporated by reference as if set forth herein in its entirety.

FIELD

The disclosure generally relates to transmitting documents between parties, and more specifically, to systems and methods for peer-to-peer secure document exchange using a decentralized storage.

BACKGROUND

Parties may desire to share documents having sensitive information. For example, a first party may share credit reports, driver licenses, social security numbers, university certificates, and similar confidential information with a second party as part of a job application, a mortgage application, a credit inquiry, a credit account (e.g., to establish a credit card), and in similar situations where confidential information may be needed to authenticate an individual. Parties may typically share sensitive documents using a file hosting service or via email, text message, or the like. A technical problem is that typical transmission methods may be unsecure, and the sensitive information may be compromised by a third party.

SUMMARY

Systems, methods, and articles of manufacture (collectively, the "system") for peer-to-peer secure document exchange are disclosed. The system may include a provider system and a verifier system. The provider system may encrypt a certified document using a session public key to generate a session encrypted certified document. The provider system may upload the session encrypted certified document to a decentralized storage, wherein in response to uploading the session encrypted certified document the decentralized storage returns a session document locator. The provider system may invoke a trusted API provider by passing a session nonce and the session document locator. In response to being invoked the trusted API provider may be configured to store the session document locator associated with the session nonce. The trusted API provider may be configured to receive a polling request comprising the session nonce from the verifier system. In response to receiving the polling request the trusted API provider may be configured to retrieve the session document locator based on the session nonce. In response to retrieving the session document locator, the trusted API provider may be configured to retrieve the encrypted certified document by querying the decentralized storage based on the session document locator.

In various embodiments, the verifier system may be configured to decrypt the encrypted certified document using a session private key associated with the session public key. In various embodiments, the provider system may receive a secure document exchange URL. The provider system may download a provider session runtime services by accessing the secure document exchange URL. The provider system may transmit the secure document exchange URL to the verifier system. In response to receiving the secure document exchange URL the verifier system may be configured to download a verifier session runtime services by accessing the secure document exchange URL. The verifier session runtime services may be configured to generate the session public key and the session private key using an encryption algorithm. The verifier session runtime services may be configured to transmit the session public key to the trusted API provider. In response to receiving the session public key the trusted API provider may be configured to generate the session nonce. The trusted API provider may be configured to return the session nonce to the verifier system. The provider system may receive the session nonce from the verifier system, The provider system may invoke the trusted API provider by passing the session nonce. In response to being invoked the trusted API provider may be configured to retrieve the session public key corresponding to the session nonce. The provider system may receive the session public key from the trusted API provider. In various embodiments, the session private key and/or the session nonce comprises an expiration duration.

In various embodiments, a verifier system may download a verifier session runtime services by accessing a secure document exchange URL, wherein the secure document exchange URL is received from a provider system. The verifier system may generate a session public key and the session private key using an encryption algorithm provided by the verifier session runtime services. The verifier system may transmit the session public key to a trusted API provider, wherein in response to receiving the session public key the trusted API provider is configured to generate a session nonce. The verifier system may receive the session nonce from the trusted API provider. The verifier system may transmit the session nonce to the provider system, In response to receiving the session nonce the provider system may be configured to invoke the trusted API provider by passing the session nonce. In response to being invoked the trusted API provider may be configured to retrieve the session public key corresponding to the session nonce. The trusted API provider may be configured to return the session public key to the provider system.

In various embodiments, in response to receiving the session public key, the provider system is configured to encrypt a certified document using the session public key to generate a session encrypted certified document. The provider system may be configured to upload the session encrypted certified document to a decentralized storage. In response to uploading the session encrypted certified document the decentralized storage may return a session document locator to the provider system. In response to receiving the session document locator, the provider system may be configured to invoke the trusted API provider by passing the session nonce and the session document locator, In response to being invoked the trusted API provider may be configured to store the session document locator associated with the session nonce. The verifier system may poll the trusted API provider by passing the session nonce to the trusted API provider. In response to receiving the polling request the trusted API provider may be configured to retrieve the session document locator based on the session nonce. In response to retrieving the session document locator, the trusted API provider may be configured to retrieve the encrypted certified document by querying the decentralized storage based on the session document locator. The verifier system may receive the encrypted certified document from the trusted API provider. The verifier system may decrypt the encrypted certified document using the session private key.

In various embodiments, the provider system may be configured to receive the secure document exchange URL and download a provider session runtime services by accessing the secure document exchange URL. In various embodiments, the session private key and/or the session nonce comprises an expiration duration.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
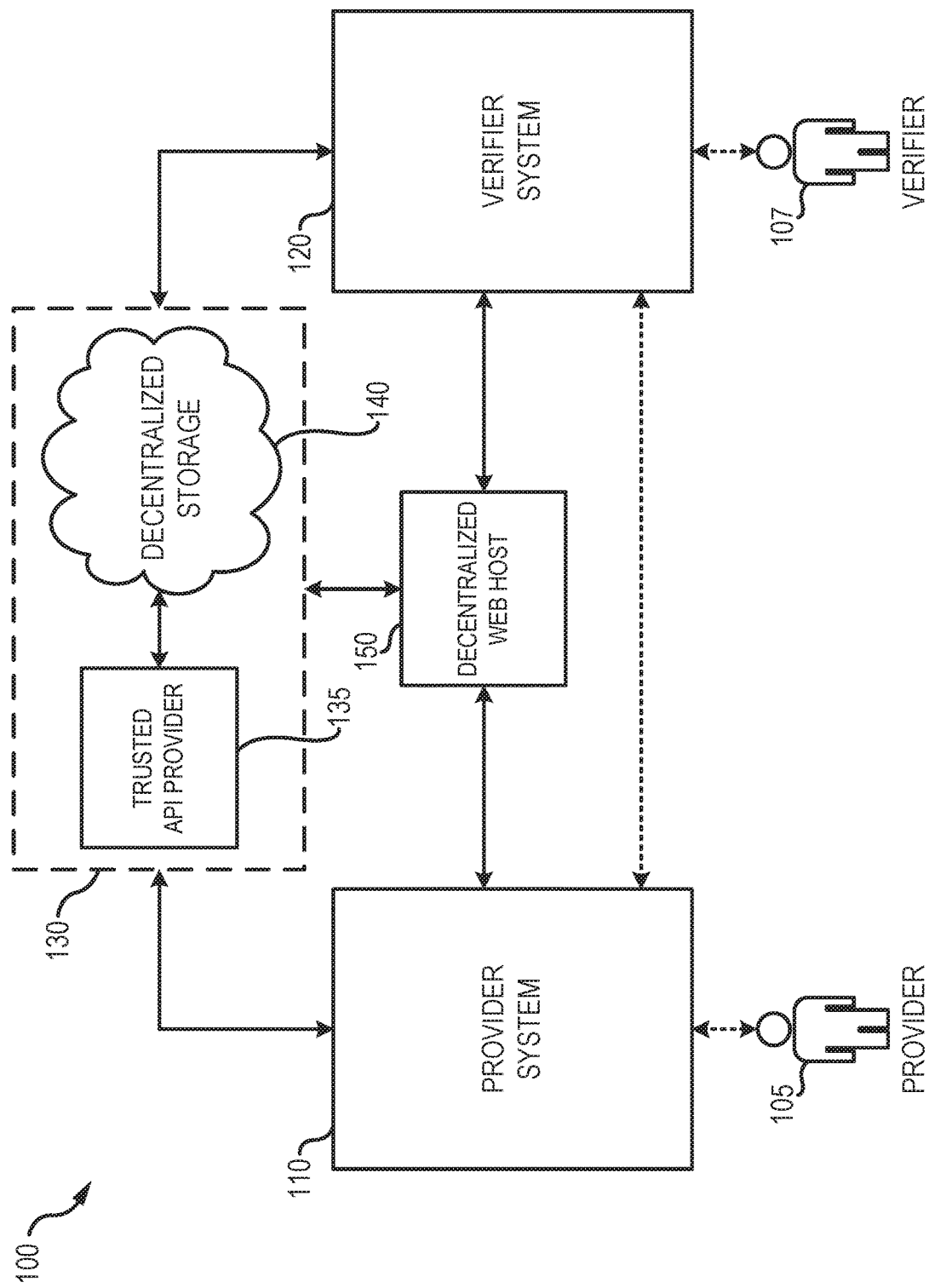
FIG. 1 is a block diagram illustrating various system components of a system for peer-to-peer secure document exchange, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In various embodiments, systems for peer-to-peer secure document exchange are disclosed. The system may allow a first party (e.g., the document provider) to securely exchange documents with a second party (e.g., the document verifier). The parties may interact with a trusted API provider to transmit and retrieve data from a decentralized storage, and/or to initialize the secure document exchange. The system may provide a technical solution to the technical problem of unsecure document exchange by enabling the parties to instantly and securely share information over a network that may be unsecure (e.g., the internet, a public network, etc.), without using typical unsecure methods of transmission such as email, text message, and the like. In various embodiments, the system provides a means for real-time, peer-to-peer secure document exchange without the need to rely on the services of a third party, such as email service provider, that typically hosts its systems in its own data centers. The system further improves the functioning of the computer and network. For example, by transmitting, storing, and accessing data using the processes described herein, the security of the data is improved, which decreases the risk of the computer or network from being compromised. For example, exchanging data using the systems and methods described herein may result in better data privacy while also enabling anonymity of the parties transmitting data.

In various embodiments, and with reference to FIG. 1, a system 100 for peer-to-peer secure document exchange is disclosed. System 100 may include various computing devices, software modules, networks, and data structures in communication with one another. System 100 may contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, system 100 may enable secure document exchanges between a provider 105 and a verifier 107. Provider 105 may comprise a user, an individual, or a party that desires to share a document with verifier 107. Verifier 107 may comprise a user, an individual, or a party that desires to receive the document from provider 105. For example, provider 105 may exchange documents having confidential or sensitive data with verifier 107 as part of a job application, a mortgage application, a credit inquiry, a credit account (e.g., to establish a credit card), and/or the like. The document may comprise a certified document. For example, the certified document may be authenticated by a trusted party (e.g., a transaction account issuer, a university, a credit bureau, DMV, etc.), via a digital signature, appended certificate, or the like. The trusted party may host or be associated with the trusted API provider 135, as discussed further herein. In various embodiments, system 100 may comprise one or more of a provider system 110, a verifier system 120, a trusted storage environment 130, and/or a decentralized web host 150.

In various embodiments, provider 105 may access provider system 110 to interact with system 100. Provider system 110 may be in electronic communication with trusted storage environment 130, decentralized web host 150, and/or verifier system 120. Provider system 110 may be configured to enable provider 105 to transmit certified documents securely to verifier 107, via verifier system 120, as discussed further herein. In various embodiments, provider system 110 may comprise any suitable hardware, software, and/or database components capable of transmitting, receiving, parsing, and storing data. For example, provider system 110 may comprise a personal computer, personal digital assistant, cellular phone, smartphone IPHONE®, BLACKBERRY®, etc.), IoT device, kiosk, and/or the like. Provider system 110 may comprise an operating system, such as, for example, a WINDOWS® mobile operating system, an ANDROID® operating system, APPLE® IOS®, a BLACKBERRY® operating system, a LINUX® operating system, and the like. Provider system 110 may also comprise software components installed on provider system 110 and configured to allow provider 105, via provider system 110 access to various system 100 components. For example, provider system 110 may comprise a web browser (e.g., MICROSOFT INTERNET EXPLORER®, GOGGLE CHROME®, etc.), an application, a micro-app or mobile application, or the like, configured to allow provider 105 to access and interact with various system 100 components. In various embodiments, provider system 110 may be computer based, and may comprise a processor, a tangible non-transitory computer-readable memory, and/or a network interface, along with other suitable system software and hardware components. instructions stored on the tangible non-transitory memory may allow provider system 110 to perform various functions, as described herein.

In various embodiments, provider system 110 may comprise various components configured to aid provider system 110 with participating in the secure document exchange process. For example, and with reference to FIG. 2A. provider system 110 may comprise one or more of a provider secure document exchange user interface (UI) 263, a provider session runtime services 265, and/or session cryptographic keys 261.

Provider secure document exchange UI 263 may comprise software, a mobile application, a web interface, or the like accessible from provider system 110. For example, provider secure document exchange UI 263 may include a graphical user interface ("GUI"), software modules, logic engines, various databases, interfaces to systems and took, and/or computer networks. For example, provider secure document exchange UI 263 may provide a GUI configured to enable provider 105 to interact with various components in system 100, and transmit and receive data, as discussed further herein.

Provider session runtime services 265 may comprise software, a mobile application, database components, or the like accessible from provider system 110. For example, provider session runtime services 265 may comprise JAVASCRIPT® code and may be downloaded from decentralized web host 150. For example, provider system 110, via provider secure document exchange UI 263, may access decentralized web host 150 to request and download provider session runtime services 265, as discussed further herein. In various embodiments, provider session runtime services 265 may be installed on provider system 110 and may be used for a plurality of secure document exchange session. In various embodiments, provider session runtime services 265 may also be configured to be available for a single secure document exchange session. In various embodiments, provider session runtime services 265 may be configured to control the end-to-end workflow for secure document exchanges. For example, provider session runtime services 265 may provide one or more software development kits (SDKs), application programming interfaces (APIs) or the like, together with decentralized media services and protocols, cryptography libraries, and the like.

In that regard, provider session runtime services 265 may also be configured to generate and/or store cryptographic keys used in the secure document exchange (e.g., session cryptographic keys). For example, provider session runtime services 265 may be configured to generate session cryptographic keys 267. Session cryptographic keys 267 may be generated using any suitable encryption algorithm, such as, for example, an asymmetric encryption algorithm including RSA, ElGamal, DSA, elliptic-curve cryptography (e.g., ECC, ECDH, ECDSA, etc.), or the like. Session cryptographic keys 267 may be generated to comprise a session public key and a session private key pair. The session private key may comprise a key timestamp created at generation of session cryptographic keys 267. The session private key may be configured to expire based on a key expiration duration relative to the key timestamp (e.g., 30 minutes, 1 hour, 1 day, etc.). In that respect, and in accordance with various embodiments, session cryptographic keys 267 may be configured for use during a single secure document exchange session, and may expire within a specified duration, as discussed further herein. In various embodiments, provider session runtime services 265 may also be configured to store session cryptographic keys 267 received from verifier system 120 as part of the secure document exchange process. For example, and as discussed further herein, provider session runtime services 265 may be configured to store a session public key received from verifier system 120.

In various embodiments, provider system 110 may also be configured to store and maintain provider cryptographic keys (e.g., a provider public key and a provider private key pair) used to encrypt and decrypt certified documents stored in decentralized storage 140. The provider cryptographic key pair may be generated using any suitable encryption algorithm, such as for example, any symmetric or asymmetric encryption algorithm discussed herein or known in the art.

In various embodiments, verifier 107 may access verifier system 120 to interact with system 100, Verifier system 120 may be in electronic communication with trusted storage environment 130, decentralized web host 150, and/or provider system 110, Verifier system 120 may be configured to enable verifier 107 to receive certified documents securely from provider 105, via provider system 110, as discussed further herein. In various embodiments, verifier system 120 may comprise any suitable hardware, software, and/or database components capable of transmitting, receiving, parsing, and storing data. For example, verifier system 120 may comprise a personal computer, personal digital assistant, cellular phone, smartphone (e.g., IPHONE®, BLACKBERRY®, etc.), IoT device, kiosk, and/or the like. Verifier system 120 may comprise an operating system, such as, for example, a WINDOWS® mobile operating system, an ANDROID® operating system, APPLE® IOS®, a BLACKBERRY® operating system, a LINUX® operating system, and the like. Verifier system 120 may also comprise software components installed on verifier system 120 and configured to allow verifier 107, via verifier system 120, access to various system 100 components. For example, verifier system 120 may comprise a web browser (e.g., MICROSOFT INTERNET EXPLORER®, GOGGLE CHROME®, etc.), an application, a micro-app or mobile application, or the like, configured to allow verifier 107 to access and interact with various system 100 components. In various embodiments, verifier system 120 may be computer based, and may comprise a processor, a tangible non-transitory computer-readable memory, and/or a network interface, along with other suitable system software and hardware components. Instructions stored on the tangible non-transitory memory may allow verifier system 120 to perform various functions, as described herein.

In various embodiments, verifier system 120 may comprise various components configured to aid verifier system 120 with participating in the secure document exchange process. For example, and with reference to FIG. 23, verifier system 120 may comprise one or more of a verifier secure document exchange user interface (UI) 273, a verifier session runtime services 275, and/or session cryptographic keys 267.

Figure 2A:
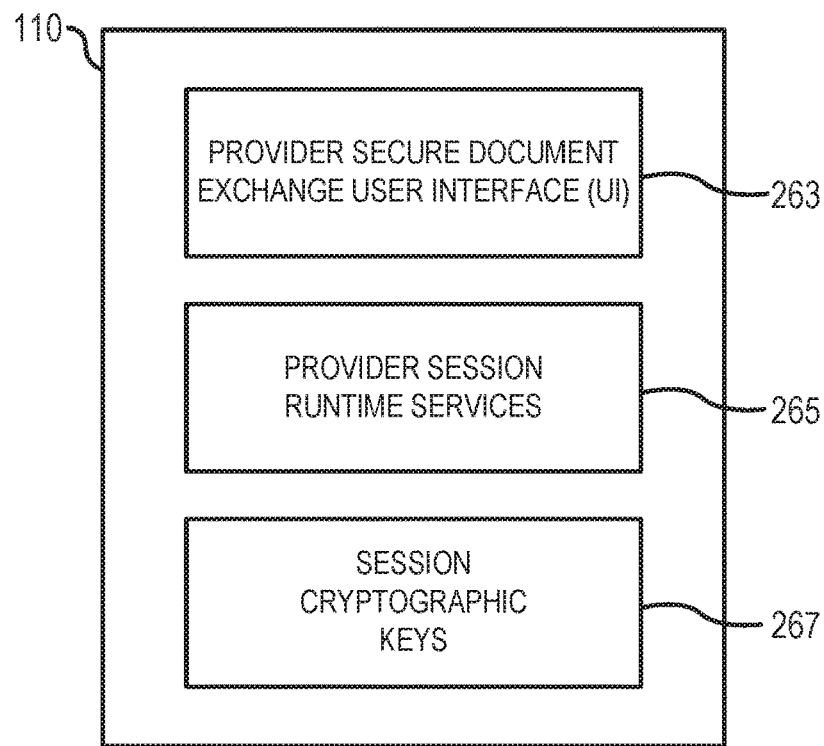
FIG. 2A illustrates an exemplary provider system in a system for peer-to-peer secure document exchange, in accordance with various embodiments.

Verifier secure document exchange UI 273 may be similar to provider secure document exchange UI 263, with brief reference to FIG. 2A. Verifier secure document exchange UI 273 may comprise software, a mobile application, a web interface, or the like accessible from verifier system 120. For example, verifier secure document exchange UI 273 may include a graphical user interface ("GUI"), software modules, logic engines, various databases, interfaces to systems and tools, and/or computer networks. For example, verifier secure document exchange UI 273 may provide a GUI configured to enable verifier 107 to interact with various components in system 100, and transmit and receive data, as discussed further herein.

Verifier session runtime services 275 may be similar to provider session runtime services 265, with brief reference to FIG. 2A. Verifier session runtime services 275 may comprise software, a mobile application, database components, or the like accessible from verifier system 120. For example, verifier session runtime services 275 may comprise JAVASCRIPT® code and may be downloaded from decentralized web host 150. For example, verifier system 120, via verifier secure document exchange UI 273, may access decentralized web host 150 to request and download verifier session runtime services 275, as discussed further herein. In various embodiments, verifier session runtime services 275 may be installed on verifier system 120 and may be used for a plurality of secure document exchange session. In various embodiments, verifier session runtime services 275 may also be configured to be available for a single secure document exchange session. In various embodiments, verifier session runtime services 275 may be configured to control the end-to-end workflow for secure document exchanges. For example, verifier session runtime services 275 may provide one or more software development kits (SDKs), application programming interfaces (APIs) or the like, together with decentralized media services and protocols, cryptography libraries, and the like.

In that regard, verifier session runtime, services 275 may also be configured to generate and/or store cryptographic keys used in the secure document exchange (e.g., session cryptographic keys). For example, verifier session runtime services 275 may be configured to generate session cryptographic keys 267. Session cryptographic keys 267 may be generated using any suitable encryption algorithm, such as, for example, an asymmetric encryption algorithm including RSA, ElGamal, DSA, elliptic-curve cryptography (e.g., ECC, ECDH, ECDSA, etc.), or the like. Session cryptographic keys 267 may be generated to comprise a session public key and a session private key pair. The session private key may comprise a key timestamp created at generation of session cryptographic keys 267. The session private key may be configured to expire based on a key expiration duration relative to the key timestamp (e.g., 30 minutes, 1 hour, 1 day, etc.). In that respect, and in accordance with various embodiments, session cryptographic keys 267 may be configured for use during a single secure document exchange session, and may expire within a specified duration, as discussed further herein. In various embodiments, verifier session runtime services 275 may also be configured to store session cryptographic keys 267 received from provider system 110 as part of the secure document exchange process. For example, and as discussed further herein, verifier session runtime services 275 may be configured to store a session public key received from provider system 110.

In various embodiments, trusted storage environment 130 may comprise one or more trusted API providers 135 and/or decentralized storages 140. Trusted storage environment 130 may be in electronic communication with provider system 110, verifier system 120, and/or decentralized web host 150. Each trusted API provider 135 and/or decentralized storage 140 may be associated with one or more trusted entities. For example, a trusted entity may be the entity that issued the certified document being exchanged in system 100 (e.g., a university issues transcripts). The trusted entity may also comprise an entity capable of authenticating certified documents, such as a bank, government entity, or the like.

In various embodiments, trusted API provider 135 may comprise software, services, database components, or the like configured to perform various operations discussed further herein. For example, trusted API provider 135 may comprise a RESTful API that integrates with decentralized storage 140. In that respect, trusted API provider 135 may be configured to write and retrieve data to decentralized storage 140, receive and transmit session public keys, and the like, as discussed further herein. In various embodiments, trusted API provider 135 may be configured to generate a session nonce. The session nonce may comprise one or more alphanumeric characters and may be generated to be unique to the secure document exchange session (e.g., a cryptographic nonce comprising various arbitrary alphanumeric characters, such as "c9La5"). The session nonce may be generated to comprise a nonce timestamp created at generation of the session nonce. The session nonce may also be configured to expire based on a nonce expiration duration relative to the nonce timestamp (e.g., 30 minutes, 1 hour, 1 day, etc.). In that respect, and in accordance with various embodiments, the session nonce may be configured for use during a single secure document exchange session, and may expire within a specified duration.

In that regard, trusted API provider 135 may be configured to receive, interact with, and write data that is non-sensitive. Trusted API provider 135 may be available on a trusted entity's system or platform, or any other suitable trusted third party, and accessible by provider system 110 and/or verifier system 120.

In various embodiments, decentralized storage 140 may be configured to store and maintain data, including encrypted certified documents, session keys, session nonces, and the like, as discussed further herein. Decentralized storage 140 may be configured to store and maintain non-sensitive data and/or data that is encrypted using a provider cryptographic key or session cryptographic keys 267. In various embodiments, decentralized storage 140 may not be affiliated with any entity in system 100, and may store and maintain the data using anonymous devices hosting the decentralized media Decentralized storage 140 may comprise any suitable decentralized storage medium capable of securely storing data. For example, and in accordance with various embodiments, decentralized storage 140 may be an InterPlanetary File System (IPFS) comprising a file system capable of storing and sharing data across a distributed, peer-to-peer network. The IPFS implementation may comprise a distributed hash table (DHT) that stores data as key (document locator)/value pairs across the peer-to-peer file system.

In various embodiments, decentralized storage 140 may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. In various embodiments, decentralized storage 140 may include one or more nodes configured to maintain a copy (or partial copy) of the blockchain, write and/or retrieve data and blocks from the blockchain, validate blocks of the blockchain, and/or propagate writes to the block chain to at least one other node. Each node may communicate with one or more nodes to validate and write blocks to the blockchain, and to establish consensus between the nodes. For example, the nodes may establish consensus based on proof of work, proof of stake, practical byzantine fault tolerance, delegated proof of stake, or other suitable consensus algorithms. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Figure 2B:
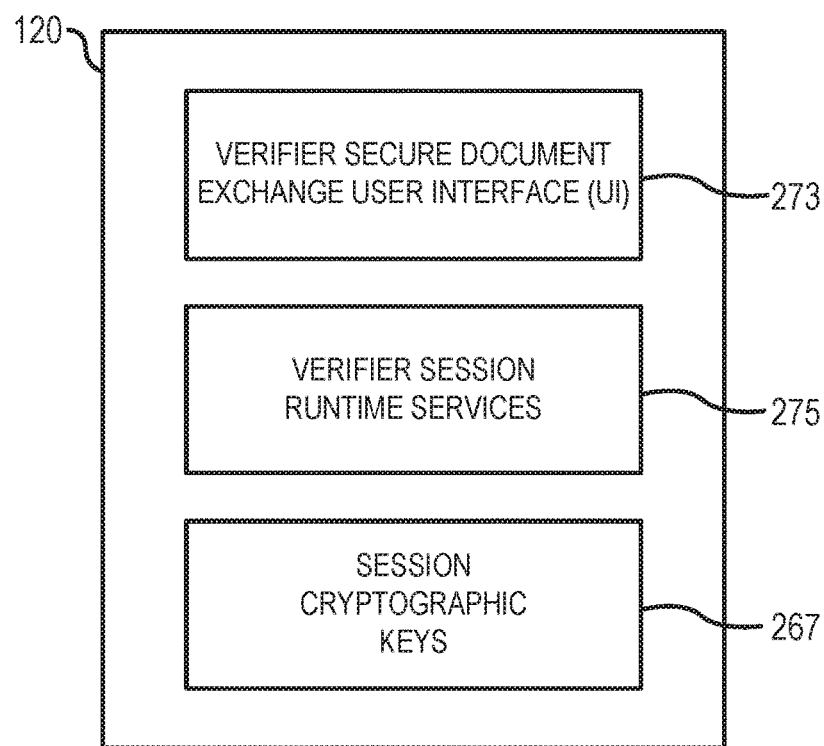
FIG. 2B illustrates an exemplary verifier system in a system for peer-to-peer secure document exchange, in accordance with various embodiments.

In various embodiments, decentralized web host 150 may comprise various software, services, database components, or the like. Decentralized web host 150 may be in electronic communication with provider system 110, verifier system 120, and/or trusted storage environment 130. In various embodiments, decentralized web host 150 may be associated with decentralized storage 140, such as, for example, as a web host or web server enabling access to various software, services, and the like configured to enable communications with decentralized storage 140. A web address used to establish communication with decentralized web host 150 may be public and well known. Decentralized web host 150 may be configured to store and maintain various session runtime services, such as, for example provider session runtime services 265 and/or verifier session runtime services 275, with brief references to FIGS. 2A and 2B. In that respect, provider 105, via provider system 110, and/or verifier 107, via verifier system 120, may access decentralized web host 150 to access and download various runtime services, as discussed further herein.

As used herein, "transmit" may include sending at least a portion of electronic data from one system 100 component to another. Additionally, as used herein, "data," "Information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire) Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing, The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available, in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Figure 3:
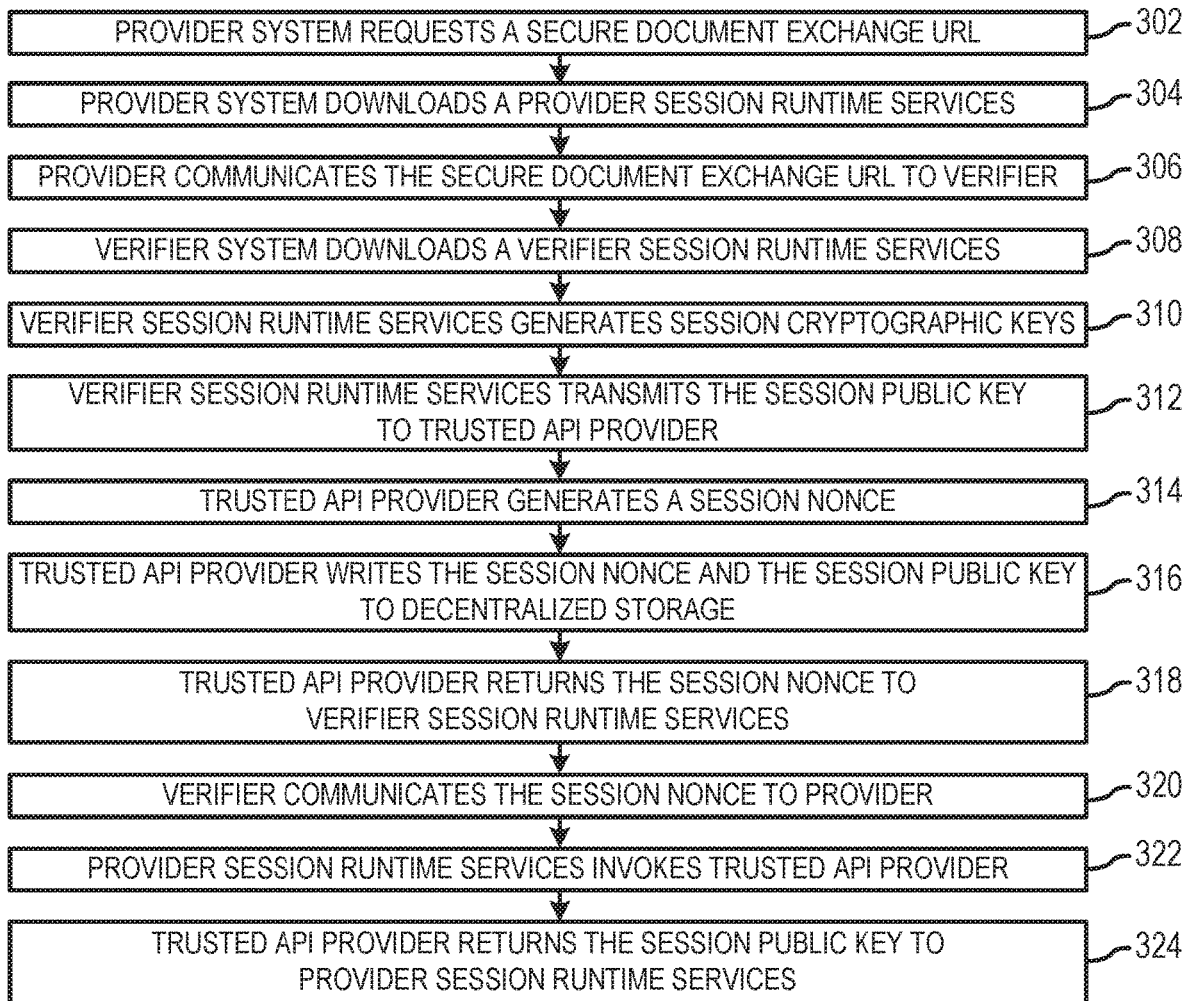
FIG. 3 illustrates an exemplary process flow for a method of initializing a secure document exchange, in accordance with various embodiments.
Figure 4:
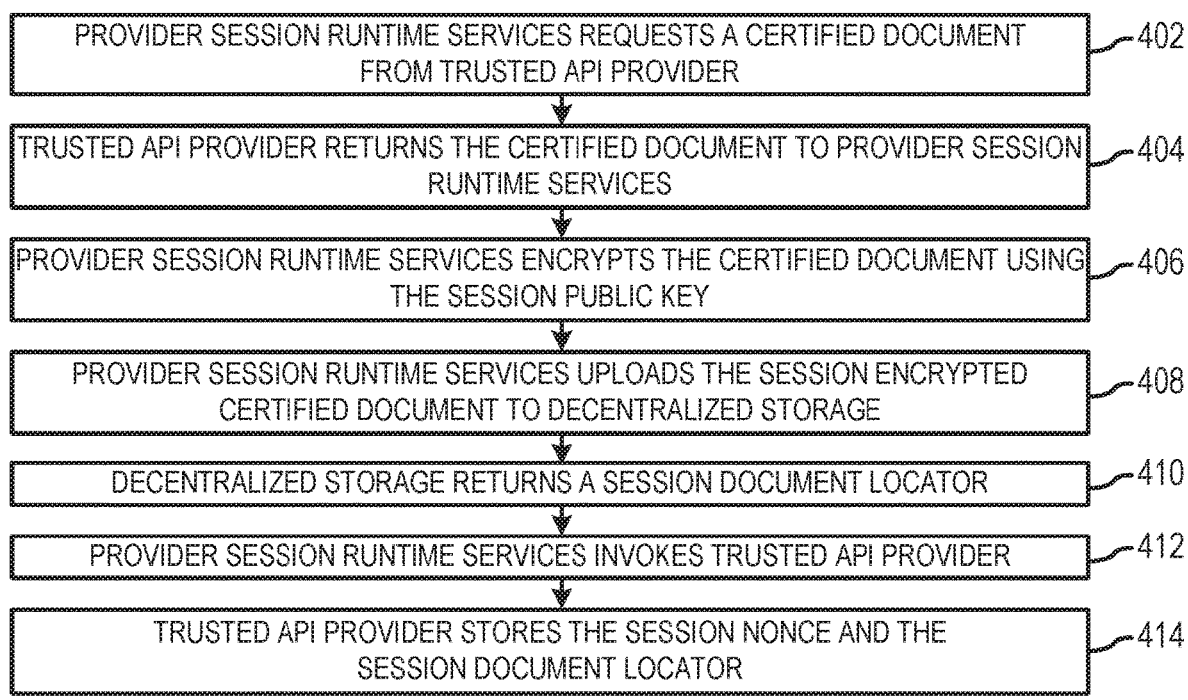
FIG. 4 illustrates an exemplary process flow for a method of uploading a certified document during a secure document exchange, in accordance with various embodiments.
Figure 5:
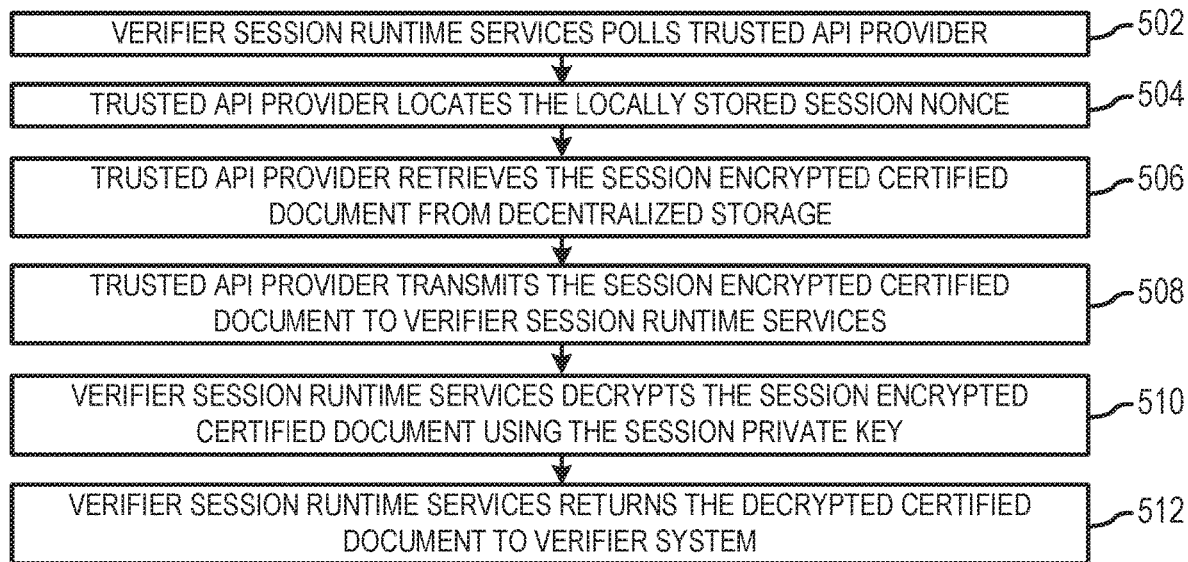
FIG. 5 illustrates an exemplary process flow for a method of retrieving a certified document during a secure document exchange, in accordance with various embodiments.

Referring now to FIGS. 3-5 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-5, but also to the various system components as described above with reference to FIGS. 1, 2A, and 2B. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, and with specific reference to FIG. 3, a method 301 for initializing a secure document exchange is disclosed. Method 301 may enable provider 105 to securely transmit one or more certified documents to verifier 107. Although method 301 describes provider 105, via provider system 110, initiating the initialization of the secure document exchange, it should be understood that the steps of method 301 may also be initiated and completed by verifier 107, via verifier system 120.

In various embodiments, provider 105 accesses provider system 110 (e.g., via provider secure document exchange UI 263) to initiate the secure document exchange. Provider system 110 requests a secure document exchange URL (step 302) from decentralized web host 150. In various embodiments, the request may comprise a trusted API provider that provider 105 and/or verifier 107 desire to use for the document exchange. For example, provider 105 may previously upload and store certified documents using a specific trusted API provider 135. In various embodiments, the request may also not specify the trusted API provider 135 to be used, and decentralized web host 150 may be configured to select the trusted API provider 135 anonymously (e.g., via a random selection process or the like). In response to receiving the request, decentralized web host 150 may be configured to generate the secure document exchange URL. The secure document exchange URL may link to a network or server location from which provider 105 and verifier 107 may access and download session runtime services, as discussed further herein. In that respect, the secure document exchange URL may be unique to each secure document exchange session. The secure document exchange URL may comprise a full URL, a TinyURL, a shortened or compact URL, or the like. Decentralized web host 150 may return the secure document exchange URL to provider system 110.

In various embodiments, provider system 110 downloads provider session runtime services 265 (step 304) by accessing the secure document exchange URL. Provider session runtime services 265 may be downloaded and installed on provider system 110 using any suitable technique and process.

Provider 105 communicates the secure document exchange URL to verifier 107 (step 306). For example, provider 105 may communicate the secure document exchange URL to verifier 107 in person or via a phone call. As a further example, provider 105 may interact with provider system 110 to transmit the secure document exchange URL to verifier 107, such as, for example, by text message (e.g., SMS, MMS, etc.), email, instant messaging, push notification, or the like. In response to receiving the secure document exchange URL, verifier system 120 downloads a verifier session runtime services 275 (step 308) by accessing the secure document exchange URL. Verifier session runtime services 275 may be downloaded and installed on verifier system 120 using any suitable technique and process.

In various embodiments, verifier session runtime services 275 generates session cryptographic keys 267 (step 310). Session cryptographic keys 267 may be generated using any suitable encryption algorithm, such as, for example, an asymmetric encryption algorithm including RSA ElGamal, DSA, elliptic-curve cryptography (e.g., ECC, ECDH, ECDSA, etc.), or the like. Session cryptographic keys 267 may be generated to comprise a session public key and a session private key pair. The session private key may comprise a key timestamp created at generation of session cryptographic keys 267. The session private key may be configured to expire based on a key expiration duration relative to the key timestamp (e.g., 30 minutes, 1 hour, 1 day, etc.). In that respect, and in accordance with various embodiments, session cryptographic keys 267 may be configured for use during a single secure document exchange session, and may expire within a specified duration. Verifier session runtime services 275 transmits the session public key to trusted API provider 135 (step 312). Trusted API provider 135 may be the trusted API provider specified by provider system 110, or anonymously selected by decentralized web host 150, in step 302. In that respect, verifier session runtime services 275 (and the corresponding provider session runtime services 265) may be instantiated to communicate only with the specified or selected trusted API provider 135.

In response to receiving the session public key, trusted API provider 135 generates a session nonce (step 314). The session nonce may comprise one or more alphanumeric characters and may be generated to be unique to the secure document exchange session (e.g., a cryptographic nonce comprising various arbitrary alphanumeric characters, such as "c9La5"). The session nonce may be generated to comprise a nonce timestamp created in response to generation of the session nonce. The session nonce may also be configured to expire based on a nonce expiration duration relative to the nonce timestamp (e.g., 30 minutes, 1 hour, 1 day, etc.). In that respect, and in accordance with various embodiments, the session nonce may be configured for use during a single secure document exchange session, and may expire within a specified duration. In various embodiments, the nonce expiration duration may be the same as the key expiration duration for the session public key. In various embodiments, the nonce expiration duration may be shorter or longer than the key expiration duration. Trusted API provider 135 writes the session nonce and the session public key to decentralized storage 140 (step 316). Trusted API provider 135 may associate the session nonce and the session public key (e,g., using a unique session ID, or based on the session nonce) in response to writing the session nonce and the session public key to decentralized storage 140.

In response to completing the write to decentralized storage 140, trusted API provider 135 returns the session nonce to verifier session runtime services 275 (step 318), Verifier session runtime services 275 may return the session nonce to verifier system 120, and/or may display the session nonce to verifier 107 via verifier secure document exchange UI 273. Verifier session runtime services 275 may also return verification of a successful (or faded) write to decentralized storage 140. Verifier 107 communicates the session nonce to provider 105 (step 320). For example, verifier 107 may communicate the session nonce to provider 105 in person or via a phone call. As a further example, verifier 107 may interact with verifier system 120 to transmit the session nonce to provider 105, such as, for example, by text message (e.g., SMS, MMS, etc.), email, instant messaging, push notification, or the like.

In response to receiving the session nonce, provider 105 and/or provider system 110 may input or pass the session nonce to provider session runtime services 265, Provider session runtime services 265 invokes trusted API provider 135 (step 322) by passing the session nonce to trusted AP provider 135. In response to being invoked, trusted API provider 135 queries decentralized storage based on the session nonce, and retrieves the session public key associated with the stored session nonce. Trusted API provider 135 returns the session public key to provider session runtime services 265 (step 324).

In various embodiments, and with specific reference to FIG. 4, a method 401 for uploading a certified document during a secure document exchange is disclosed. In response to receiving the session public key in step 324 of method 302 (with brief reference to FIG. 3), provider 105 may desire to select one or more certified documents to be securely exchanged with verifier 107. In various embodiments, the certified documents may be previously uploaded and stored in decentralized storage 140. For example, wherein trusted API provider 135 comprises a university, certified documents relating to transcripts, degree conferrals, or the like may be uploaded and maintained by trusted API provider 135 into decentralized storage 140. In that respect, the certified documents may also be electronically signed or appended with a digital certificate comprising data indicating that the given digital certificate is authenticated from a trusted source (e.g., the trusted API provider 135).

In various embodiments, provider session runtime services 265 requests a certified document from trusted AR provider 135 (step 402). For example, provider session runtime services 265 may request the certified document by selecting from an available document list (e.g., displayed via provider secure document exchange UI); by transmitting a document ID, a document locator, or the Ike; and/or through any other suitable method. Based on the request, trusted AR provider 135 may be configured to query decentralized storage 140 to retrieve the certified document. In response to retrieving the certified document, trusted API provider 135 returns the certified document to provider session runtime services 265 (step 404).

In various embodiments, the certified document may be encrypted using a provider public key. In response to receiving the certified document, provider system 110, via provider session runtime services 265, may be configured to decrypt the certified document using the provider private key associated with the provider public key, Provider session runtime services 265 encrypts the certified document using the session public key (step 406) to generate a session encrypted certified document. Provider session runtime services 265 uploads the session encrypted certified document to decentralized storage 140 (step 408). Provider session runtime services 265 may directly upload the session encrypted certified document to decentralized storage 140, and may write the data using any suitable technique.

Decentralized storage 140 returns a session document locator (step 410) to provider session runtime services 265 in response to storing the session encrypted certified document. In various embodiments, the session document locator may comprise an identifier (ID) or the like corresponding to and associated with the session encrypted certified document. In various embodiments, the session document may comprise a hash of the session encrypted certified document. The hash may be generated using any suitable hashing algorithm. In that respect, the session encrypted certified document may be retrieved by querying decentralized storage 140 based on the session document locator.

In response to receiving the session document locator, provider session runtime services 265 invokes trusted API provider 135 (step 412) by passing the session nonce and the session document locator. In response to being invoked, trusted AR provider 135 locally stores the session nonce and the session document locator (step 414). For example, trusted API provider 135 may store the session nonce and the session document locator in temporary local storage.

In various embodiments, and with specific reference to FIG. 5, a method 501 for retrieving a certified document during a secure document exchange is disclosed. Verifier session runtime services 275 polls trusted API provider 135 (step 502) by passing the session nonce to trusted API provider 135. In various embodiments, verifier session runtime services 275 may be configured to poll trusted API provider 135 in response to receiving the session nonce in step 318 of method 301, with brief reference to FIG. 3. Verifier session runtime services 275 may be configured to poll trusted API provider 135 at any suitable polling interval (e.g., 30 seconds, 1 minute, 5 minutes, etc.). In that regard, verifier session runtime services 275 may be configured to continually poll trusted API provider 135 until the session encrypted certified document has been uploaded to decentralized storage 140 (e.g., step 408 of method 401, with brief reference to FIG. 4) and trusted API provider 135 has stored the session nonce and the session document locator (e.g., step 414 of method 401, with brief reference to FIG. 4).

In response to being polled by verifier session runtime services 275, trusted API provider may query its local storage to determine whether the session nonce exists. In various embodiments, trusted API provider 135 locates the locally stored session nonce (step 504). In response to locating the locally stored session nonce, trusted API provider 135 may identify the associated session document locator (e.g., as stored in step 414 of method 401, with brief reference to FIG. 4). In various embodiments, trusted API provider 135 may also verify the timestamp of the session nonce to determine whether the session nonce has expired. In response to determining that the session nonce has expired, trusted API provider 135 may transmit data back to verifier session runtime services 275 indicating that the session has expired. In response to determining that the session nonce is valid, trusted API provider 135 retrieves the session encrypted certified document from decentralized storage 140 (step 506) based on the session document locator. For example, trusted AR provider 135 may query decentralized storage 140 based on the session document locator to locate and retrieve the session encrypted certified document. Trusted API provider 135 transmits the session encrypted certified document to verifier session runtime services 275 (step 508).

In various embodiments, verifier session runtime services 275 decrypts the session encrypted certified document using the session private key (step 510). Verifier session runtime services 275 returns the decrypted certified document to verifier system 120 (step 512). In various embodiments, verifier 107 may access verifier system 120 and review the decrypted certified document, such as, for example, via verifier secure document exchange UI 273. In response to receiving and/or reviewing the decrypted certified document, verifier 107 may communicate with provider 105 that the certified document has been received.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device, coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, a will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card international Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®. YOUTUBE®, PANDORA®, APPLE TV®, MICROSOFT® XBOX®, ROKU®, AMAZON FIRE®, GOOGLE CHROMECAST™, SON.Y.® PLAYSTATION®, NINTENDO® SWITCH®, etc.) a uniform resource locator "URL"), a document (e.g., a MICROSOFT® Word™ or EXCEL®, an ADOBE® Portable Document Format (PDF) document, etc.), an "ebook" an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile, device, communication. Examples of social media sites include FACEBOOK®, FOURSQUARE®, TWITTER®, LINKEDIN®, INSTAGRAM®, PiNTEREST®, TUMBLR®, REDDIT®, SNAPCHAT® WHATSAPP®, FLICKR®, VK®, OZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. R will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID.® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The systems, computers, computer based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSOL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOGGLE® Web Server, SUN JAVA® System Web Server, JAVA® Virtual Machine running on LINUX® or WINDOWS® operating systems).

Users, systems, computer based systems or the like may communicate with the server via a web client. The web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNI X® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single the in the form of rows and columns, with no structure for indexing and no structural relationships between records. For example, a flat file structure may include a delimited text file, a CSV (comma-separated values) the, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT®. Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a key "field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREE, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trader, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trader, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Carnal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPE"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible, markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VB Script, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SON.Y. BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A system, comprising:
   a computing device comprising a processor and a memory; and
   machine-readable instructions stored in the memory that, when executed by the processor, cause the computing device to at least:
   transmit a session public key to a Trusted Application Programming Interface (API) Provider;
   receive an encrypted session nonce from the Trusted API Provider, the encrypted session nonce being encrypted with the session public key;
   transmit the encrypted session nonce to a provider system;
   receive an encrypted document and the encrypted session nonce from the provider system;
   decrypt the encrypted document and the encrypted session nonce using a session private key to generate a decrypted document and a decrypted session nonce; and
   verify the decrypted document based at least in part on the decrypted session nonce.

2. The system of claim 1 wherein the decrypted session nonce comprises a timestamp and the machine-readable instructions that cause the computing device to verify the decrypted document based at least in part on the decrypted session nonce further cause the computing device to determine whether the decrypted session nonce has expired based at least in part on the timestamp of the decrypted session nonce.

3. The system of claim 1, wherein the machine-readable instructions further cause the computing device to at least send to the provider system or the Trusted API Provider a message indicating that the decrypted document has been verified.

4. The system of claim 1, wherein the machine-readable instructions further cause the computing device to at least generate the session public key and the session private key.

5. The system of claim 4, wherein the machine-readable instructions further cause the computing device to associate a timestamp with the session private key, the time stamp indicating a future expiration of the session private key.

6. The system of claim 1, wherein the decrypted session nonce comprises an alphanumeric string of characters.

7. A method, comprising: transmitting, by a computing device, a session public key to a Trusted Application Programming Interface (API) Provider;
   receiving, by the computing device, an encrypted session nonce from the Trusted API Provider, the encrypted session nonce being encrypted with the session public key;
   transmitting, by the computing device, the encrypted session nonce to a provider system;
   receiving, by the computing device, an encrypted document and the encrypted session nonce from the provider system;

decrypting, by the computing device, the encrypted document and the encrypted session nonce using a session private key to generate a decrypted document and a decrypted session nonce; and verifying, by the computing device, the decrypted document based at least in part on the decrypted session nonce.

8. The method of claim 7, wherein the decrypted session nonce comprises a timestamp and wherein the method further comprises:

verifying, by the computing device, the decrypted document based at least in part on the decrypted session nonce; and determining, by the computing device, whether the decrypted session nonce has expired based at least in part on the timestamp of the decrypted session nonce.

9. The method of claim 7, further comprising sending, by the computing device, a message indicating that the decrypted document has been verified to the provider system or the Trusted API Provider.

10. The method of claim 7, further comprising generating, by the computing device, the session public key and the session private key.

11. The method of claim 10, further comprising associating, by the computing device, a timestamp with the session private key, wherein the time stamp indicating a future expiration of the session private key.

12. The method of claim 7, wherein the decrypted session nonce comprises an alphanumeric string of characters.

\* \* \* \* \*